United States Patent [19]
Hofmann

[11] Patent Number: 5,175,398
[45] Date of Patent: Dec. 29, 1992

[54] CABLE DEVICE

[75] Inventor: Robert Hofmann, Nuremberg, Fed. Rep. of Germany

[73] Assignee: TA Triumph-Adler AG, Nuremberg, Fed. Rep. of Germany

[21] Appl. No.: 779,949

[22] Filed: Oct. 21, 1991

[30] Foreign Application Priority Data

Oct. 25, 1990 [DE] Fed. Rep. of Germany ....... 4033880

[51] Int. Cl.⁵ .............................................. H01B 7/06
[52] U.S. Cl. ...................... 174/169; 174/135; 174/DIG. 8; 174/DIG. 9; 191/12 R; 400/682
[58] Field of Search ................ 174/69, 74 A, DIG. 9, 174/135, 72 TR, DIG. 8; 312/223; 191/12 R, 12 S, 12 C; 24/129 D, 115 K, 115 R; 361/342, 391, 428; 200/5 A; 340/711; 364/708; 400/682, 692, 479

[56] References Cited
U.S. PATENT DOCUMENTS

| | | | |
|---|---|---|---|
| Re. 24,074 | 10/1955 | Buchanan | 174/74 A X |
| 2,462,410 | 2/1949 | Lindenblad | 174/69 X |
| 2,865,979 | 12/1958 | Klassen | 174/69 |
| 3,399,909 | 9/1968 | Ambrose | 174/69 X |
| 3,488,430 | 1/1970 | Holzhauser | 174/69 |
| 3,647,936 | 3/1972 | Dryg | 174/69 |
| 4,034,150 | 7/1977 | Burnett, III | 174/69 |
| 4,358,212 | 11/1982 | Compton | 24/115 K |
| 4,614,383 | 9/1986 | Polley et al. | 174/69 X |

Primary Examiner—Leo P. Picard
Assistant Examiner—Hyung S. Sough
Attorney, Agent, or Firm—Michael J. Striker

[57] ABSTRACT

A cable device for connecting electrical apparatuses with a power source or housing parts of electrical apparatuses with one another has a foldable electrical cable which has a plurality of folds with folding regions therebetween, and fixing elements which fix bending points in the folding regions against turning movements.

8 Claims, 3 Drawing Sheets

CABLE DEVICE

BACKGROUND OF THE INVENTION

The present invention relates to a cable device with a foldable electrical cable for connecting electrical apparatuses with a power source or for connecting housing parts of electrical apparatuses with one another, such as for example for connecting a keyboard with a housing of a portable computer.

Such cable devices are practically used in all electrical apparatuses. In many cases such apparatuses are not permanently connected with a power source through the cable device, or the individual housing parts of the apparatus must be separated from one another or assembled so that a cable device is not required or required not over the whole length. In such cases there is a problem to store the cable in a maximum simple and space-consuming manner.

For this purpose it is known to insert the cable by rolling in a recess of the housing, such as for example in vacuum cleaners. For rolling of the cable a cable drum must be provided. The cable drum cannot have a small diameter in order to provide winding and therefore leads to a relatively high space consumption.

Further it is known to provide in the apparatus a cable which is wound in a helical manner. Under application of an expansion stress the cable is stretched and in a non-stretched condition it is compressed and can be packed in the recess of the apparatus or in associated package housing. In this solution the helical diameter cannot be too small for obtaining a reliable operation. Therefore, a non-used space remains in the interior of the cylindrical casing formed by the helical configuration.

Finally, it can be recognized from all types of folding or rolling of electrical cable, that the bending stress on the cable must not be high to prevent breakage of the cable or to prevent breakage of metal wires or screen in the individual cables. The cable which is protected with a metal screen cannot be used in condition of frequent intensive bending loads with small bending radius.

SUMMARY OF THE INVENTION

Accordingly, it is an object of the present invention to provide a cable device of the above-mentioned general type, which is designed so that it makes possible a very space economical mounting of the cable and simultaneously it is guaranteed that in the event of frequent pulling out and subsequent storing of the cable device, the metallic conduits or screening are not broken.

In keeping with these objects and with others which will become apparent hereinafter, one feature of the present invention resides, briefly stated, in a cable device which has a cable having a plurality of folds, and its bending points in the region of foldings are fixed by fixing elements to prevent turning movements.

The cable can be a Z-shaped cable or a zigzag-shaped cable. As a result, it can be assembled in a very narrow space so as to avoid a non-used portions of the space, as was in the case the utilization of the cable drum or a helical cable. For performing such a Z-fold or zigzag-shaped fold, the cable must be bent in the bending region practically by 180°. For unloading such breakage-susceptible bending, especially in the event of frequent load changes, the inventive fixing elements are arranged in these regions. As a result, during pulling out of the cable the folding is distributed in an arcuate manner practically over the whole respective cable portion. Thereby, the strong bending at the individual points is also prevented, which otherwise would lead to damages to the outer isolation as well as the respective shielding.

An especially advantageous application of the present invention is, for example, to use the cable device for connecting the housing of a portable computer, or a so-called laptop, with the removable associated keyboards.

In accordance with a preferable embodiment of the present invention, the fixing elements are formed as caps which are fitted on the bending points in the folding regions of the cable. The cable is bent approximately by 180° and then fixed by the fitting of the respective caps on it.

In the region of the bending of the cable, the caps can have recesses which engage behind bending beads of the cable. As a result, the cap is reliably fixed on the cable.

In accordance with an alternative preferable embodiment of the invention, the fixing elements can be formed as elements which are open at an end side. For example they can be formed as ring-shaped closed holding clamps or U-shaped holding clamps. The holding clamps can also have a substantially rectangular contour for adapting to the outer contour of the cable in the regions of bending.

The fixing elements can be composed of an elastic material, for example a synthetic plastic material. As a result a fixed seat of the fixing elements on the one hand and their easy mounting on the other hand is obtained. Basically, however it is possible to select another material, such as for example in form of metal rings or metal caps, and depending on the conditions also an attractive decorative action can be produced.

A further possibility in designing of the fixing element is that a fitted-on and thermally fixed shrinkage hose portion is used to form the fixing element. The hose is a synthetic plastic hose which is stretched during the manufacture. Then during heating it assumes its initial, smaller cross-section so as to firmly and permanently enclose the folding regions.

The cable device can be accommodated in a recess of the housing, which recess has a shape dependent on the apparatus. For this purpose, the Z-shaped folding portions of the cable have different lengths over a predetermined length of the cable. As a result, when the cable is folded it assumes a stepped shape with a longer part and a shorter part which are completely accommodated in the recess.

Finally, it is also possible to arrange the cable device in a large surface recess of one housing part of an electrical apparatus while another housing part is provided with a guiding rib which displaces the cable device into the recess. The guiding ribs can be formed in alignment with the side wall of the recess. Therefore during placing the second housing part the cable is guided by the guiding rib into the recess.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
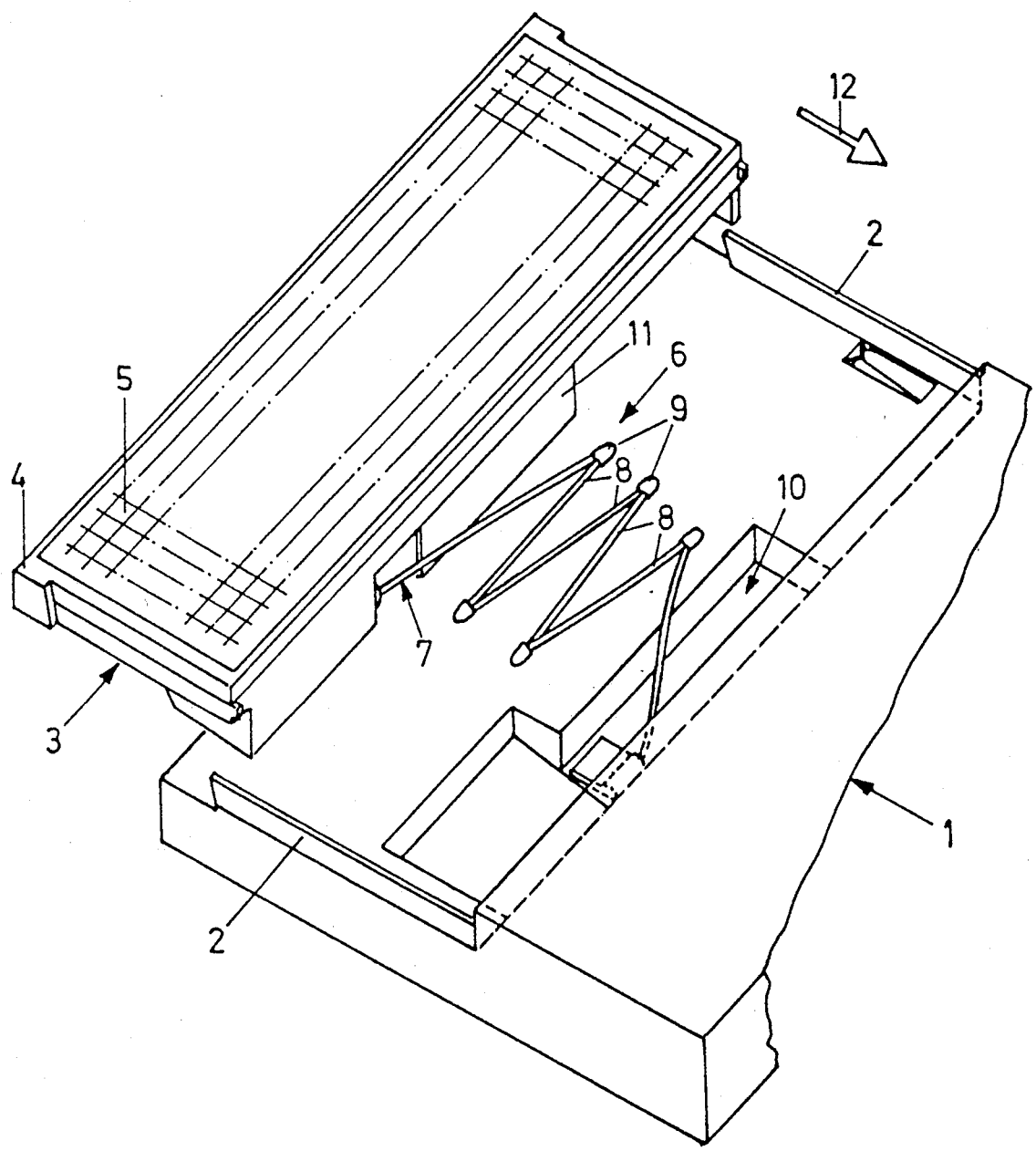
FIG. 1 is a perspective, schematic view of a keyboard of a portable computer in a partially removed condition with the use of the cable device in accordance with the present invention.

In the embodiment of FIG. 1 a partially broken housing is identified with reference numeral 1. The housing 1 is a housing of an electrical apparatus, such as for example a so-called laptop in this example. A keyboard 3 provided with a housing 4 is insertable into the housing 1 of the laptop via lateral guiding ribs 2 in a form-locking manner. Thereby the keyboard 3 with the housing 1 of the device can be together stored or carried. On the other hand, the keyboard 3 can be easily removed to provide an ergonomic handling during the utilization of the device. In FIG. 1 the keyboard 3 is shown in partially removed condition.

A cable device 6 is provided for transmitting the input commands produced by pressing the keys 5 of the keyboard. The cable device 6 includes an electrical cable 7 which is connected with the keyboard 3 and the housing 1.

The cable 7 is folded in a Z-shaped or zigzag-shaped manner so as to form a plurality of individual portions 8. In the folding regions, folds of approximately 180° are provided. Caps 9 are placed on the folding regions and thereby fix the cable 7 in the folding regions as fixing elements. As a result, the folding regions cannot transmit alternating loads to the cable 7 and as a result the danger of breaking in this region of the isolation, the shielding or the conductor wires is prevented.

In the assembled condition, or in other words when the keyboard 3 is mounted on the housing 1, the cable device 6 is received in a recess 10 of the housing 1. The guiding ribs 11 provided on the keyboard 3 displace the cable device 6 or its individual portions 8 into the recess when the keyboard 3 is displaced in direction of the arrow 12 in the housing 1.

Figure 2:
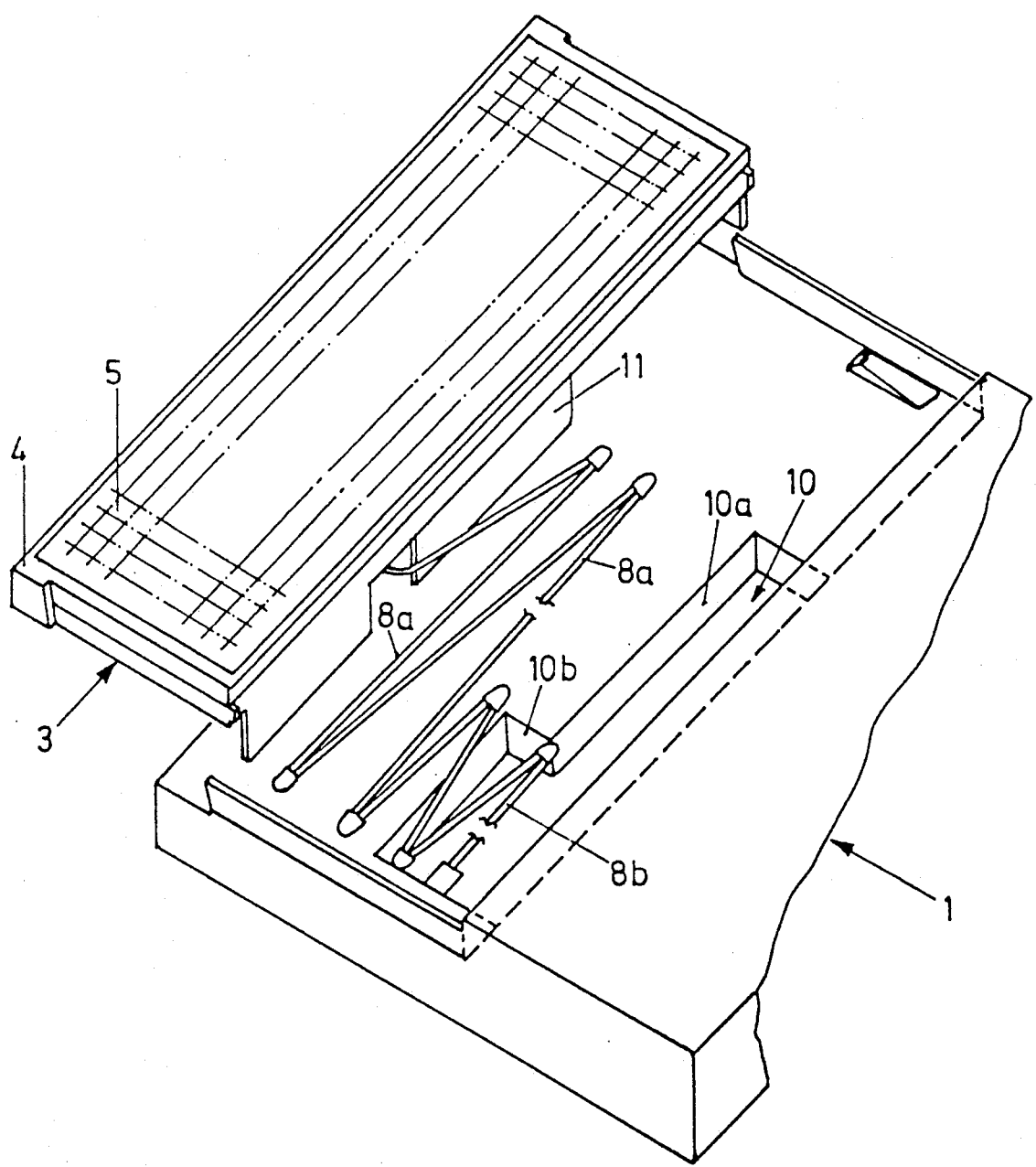
FIG. 2 is a view substantially corresponding to the view of FIG. 1, but showing the cable device in accordance with another embodiment of the present invention.

The embodiment shown in FIG. 2 substantially corresponds to the embodiment shown in FIG. 1. However, here the portions 8 of the cables 7 are subdivided into two groups of different lengths. In particular, the portions 8 include portions 8a and 8b. As a result, the stepped recess 10 of the housing 1 can be completely utilized. More particularly the shorter portions 8b are inserted in the shorter part 10b of the recess 10, while the longer portions 8a can be accommodated in the longer portion 10a of the recess 10.

In this embodiment the recess 10 can be practically completely utilized without leaving any useful space vacant.

Figures 3, 4:
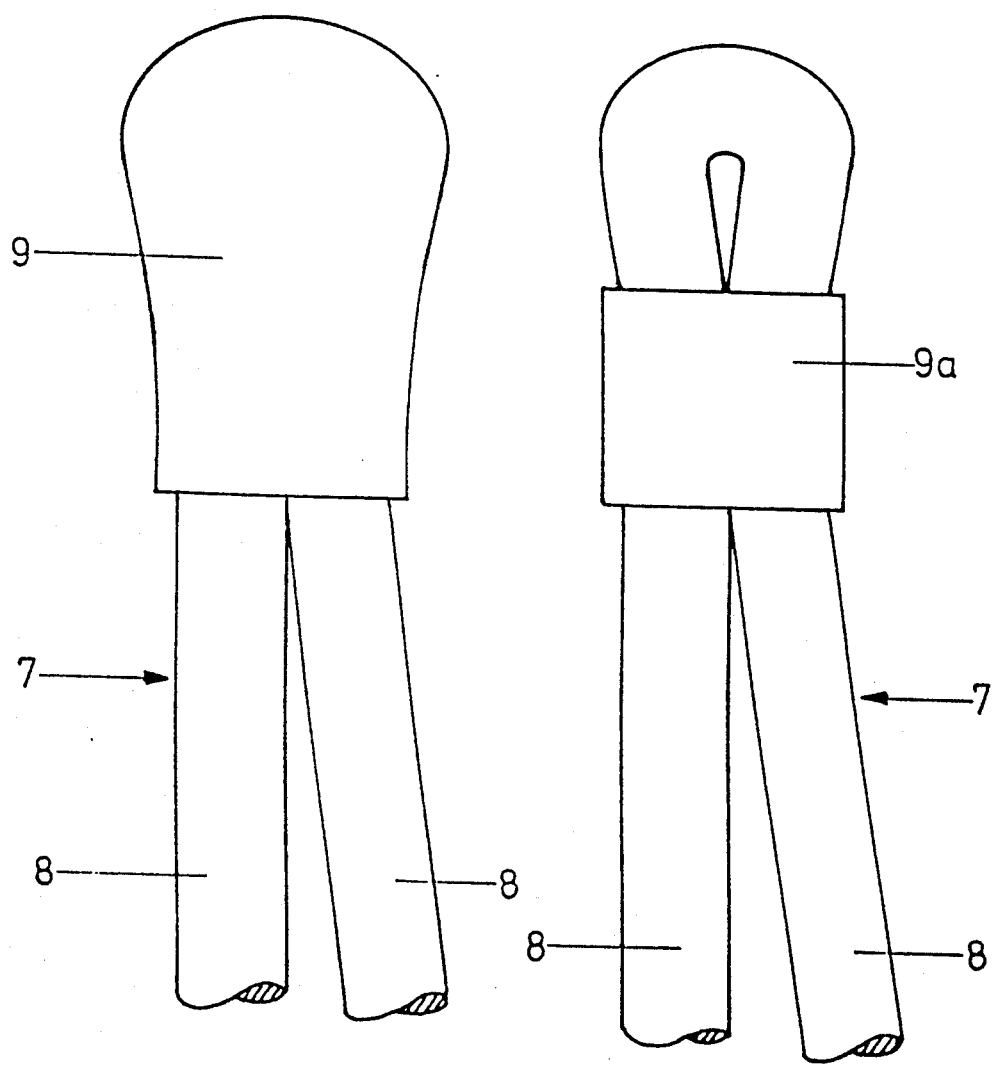
FIG. 3 is a view showing a fixing element for a folding region of a cable of the cable device in accordance with the present invention.
FIG. 4 is a view substantially corresponding to the view of FIG. 3, but showing the fixing element in accordance with a further modification of the invention.

FIGS. 3 and 4 illustrate folding regions between two cable portions 8. In the embodiment of FIG. 3 a fixing element 9 which is fitted on the cable in the folding region is cap-shaped. The fixing element 9 is composed of an elastic material. In contrast, in the embodiment of FIG. 4, the fixing element 9a is ring-shaped. While the fixing element 9 of FIG. 3 completely covers the folding region, the fixing element 9a of FIG. 4 is displaced from the folding region somewhat to the main part of the cable portion 8.

The fixing elements 9a can be formed as closed or open holding clamps.

Finally, the fixing elements can be formed as fitted on and thermally fixed shrinkage hose portions.

It will be understood that each of the elements described above, or two or more together, may also find a useful application in other types of constructions differing from the types described above.

While the invention has been illustrated and described as embodied in a cable device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims.

1. A cable device for connecting electrical apparatuses with a power source or housing parts of electrical apparatuses with one another, comprising a foldable electrical cable which has a plurality of folds with folding regions therebetween; and fixing elements which fix bending points in said folding regions against turning movements and are formed as closed caps which are fitted on the cable at said bending points in said folding regions.

2. A cable device as define din claim 1, wherein said folds of said cable are Z-shaped.

3. A cable device as defined in claim 1, wherein said folds of said cable are zigzag-shaped.

4. A cable device as defined in claim 1, wherein said fixing elements are composed of an elastic material.

5. A cable device as defined in claim 1 respectively comprising two parts with which said cable is connected, one of said parts having a recess, the other of said parts having a guiding rib for displacing said cable into said recess during moving said parts towards one another.

6. A cable device for connecting electrical apparatuses with a power source or housing parts of electrical apparatuses with a power source or housing parts of electrical apparatuses with one another, comprising a foldable electrical cable which has a plurality of folds with folding regions therebetween; and fixing elements which fix bending points in said folding regions against turning movements, said folding regions of said cable having different lengths over a predetermined length of said cable.

7. A cable device as defined in claim 6, wherein said fixing elements are formed as thermally fixed shrinkage hose portions which are fitted on said bending point in said folding regions of said cable.

8. A cable device for connecting electrical apparatuses with a power source or housing parts of electrical apparatuses with one another, comprising a foldable electrical cable which has a plurality of folds with folding regions therebetween; fixing elements which fix bending points in said folding regions against turning movements; and two parts with which said cable is connected, one of said parts having a recess, while the other fixed part has a guiding rib which displaces said holding regions of said cable into said recess, said recess having a shorter recess part and a longer recess part, said folding regions including shorter folding regions receivable in said shorter recess parts and longer portions receivable in said longer recess parts.

* * * * *